May 20, 1969  R. G. BEAUDRY ET AL  3,445,699
MULTIROTOR INDUCTION MOTOR
Filed Aug. 31, 1965  Sheet 1 of 2

Russell G. Beaudry, INVENTORS.
Bernhard N. Polm,
BY
Paul A. Weilein
Attorney

Russell G. Beaudry,
Bernhard N. Palm,
INVENTORS.

BY Paul A. Weilein
Attorney

United States Patent Office 3,445,699
Patented May 20, 1969

3,445,699
MULTIROTOR INDUCTION MOTOR
Russell G. Beaudry, Arcadia, and Bernhard N. Palm, Fullerton, Calif., assignors to Reuland Electric Company, City of Industry, Calif., a corporation of California
Filed Aug. 31, 1965, Ser. No. 483,913
Int. Cl. H02k *1/22, 1/26*
U.S. Cl. 310—125       12 Claims

ABSTRACT OF THE DISCLOSURE

An induction motor in which a stator winding provides a rotating field having magnetic coupled driving relation with dual concentric rotors in which the inner rotor has a power delivery shaft and may comprise either a squirrel cage winding or a wound rotor type winding with slip ring connections, while the outer rotor is of the squirrel cage type and is mounted for independent free rotation, the squirrel cage bars of the outer rotor being arranged to respond to changes in slip frequency during motor starting acceleration so as to modulate the rotating field with respect to the inner rotor and provide a soft start low torque operation.

---

The present invention relates generally to electric motors, and is more particularly concerned with motors of the alternating induction type.

Heretofore, various arrangements have been utilized to smooth out and control the operation of induction motors during starting. In order to adapt the motor for various types of starting loads and conditions of operation, such expedients have in the main comprised the use of starting compensators, and the use of various types of rotors including the squirrel cage type with high resistance bars, and wound rotors with slip rings permitting use of external resistors for controlling the torque characteristics.

The present invention in its broad concepts embraces unique means for automatically modulating and controlling the stator field flux with respect to a power delivering rotor which may be either a squirrel cage type or a wound rotor type.

It is one object of the herein described invention to provide a dual rotor motor wherein an inner rotor drives a power delivery shaft, and an outer independently rotatably mounted concentrically arranged rotor is in magnetically coupled relation with the inner rotor and operates to vary its torque characteristics during starting acceleration.

A further object is to provide an induction motor of the squirrel cage type having a soft starting torque which will be gradually and smoothly applied and thus make it applicable for use as a power source in driving cranes, conveyors, and the like, where there may be frequent starting, stopping and reversing of high inertia loads.

Another object is to provide an electric motor of the induction type having dual rotors in concentric relation in which the outer rotor is of such construction that it may be rotatably supported on the stator or on the power delivery shaft of the inner rotor, and utilized as a means for providing circulation of a cooling medium around and through the associated motor components.

It is also an object to provide an induction motor with relatively rotatably mounted concentric rotors, wherein the outer rotor may be of solid or laminated construction, depending upon the type of operation in which the motor will be used.

Further objects of the invention will be brought out in the following part of the specification, wherein detailed description is for the purpose of fully disclosing the invention without placing limitations thereon.

Referring to the accompanying drawings, which are for illustrative purposes only:

Figures 1, 2, 3:
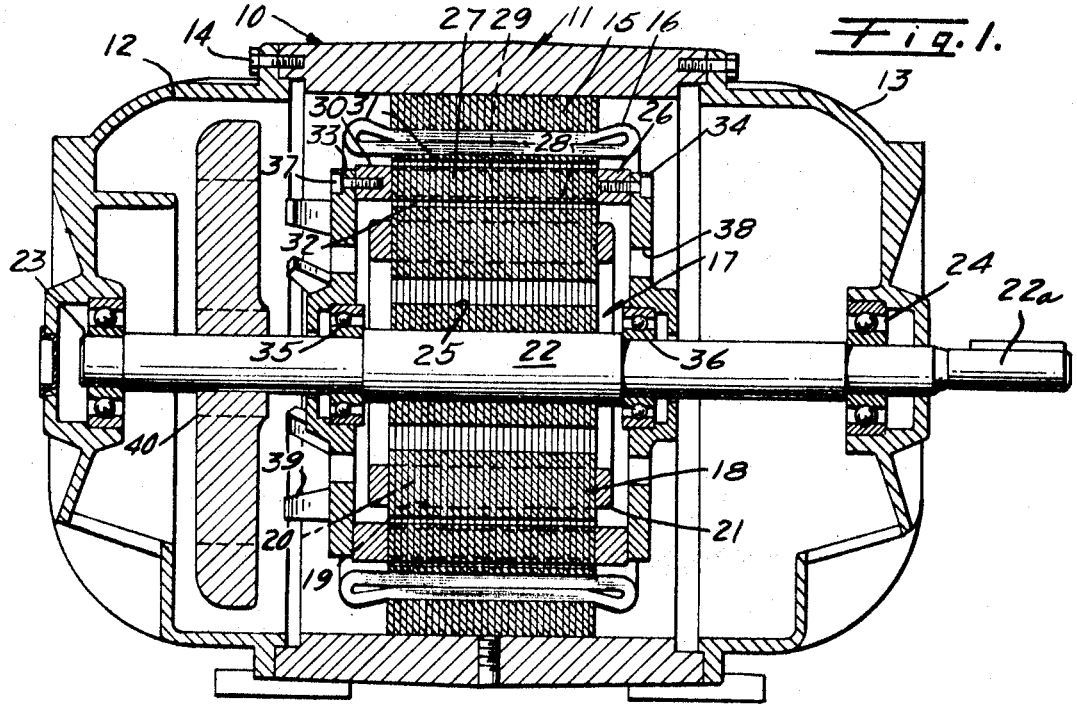
FIG. 1 is a longitudinal vertical sectional view showing the construction and association of the component parts of a motor embodying the features of the present invention.
FIG. 2 is a fragmentary view diagrammatically showing operating characteristics of the motor.
FIG. 3 is a graph showing the relationship between the inner rotor torque and outer rotor speed.

Referring now more specifically to the drawings, for illustrative purposes, a motor embodying the features of the present invention is disclosed in FIG. 1 as having a housing structure 10 which includes an annular stator field frame 11 to which end heads 12 and 13 are respectively connected as by securing bolts 14.

The stator field frame supports between its ends a plurality of stacked laminations 15 forming a field core in which conventional field coil windings 16 are provided to form a rotating field when energized by a suitable alternating current source.

Operatively associated with the stator and rotatably mounted within the field core, is an inner rotor 17 which is here illustrated as of conventional squirrel cage type including a plurality of stacked laminations 18 which are punched or otherwise formed to provide relatively deep axially extending peripheral slots 19 within which die cast aluminum or copper bars 20 are effectively embedded and connected to end rings 21 in conventional manner to provide a high reactance in the inner rotor structure.

The inner rotor 17 is fixedly mounted upon a power delivery shaft 22, one end of this shaft being supported within an antifriction bearing assembly 23 carried by the end head 12, while the other end of the shaft is supported in an antifriction bearing assembly 24 carried by the end head 13. This end of the shaft is provided with an end extension 22a which may be connected to a driving pulley, gear, or other power delivery member. A plurality of axially extending passages 25 extend through the stacked laminations to provide for the circulation of air or other cooling medium therethrough.

As thus far described, the structure of FIG. 1 is quite conventional for a squirrel cage motor. Such motors in the main have relatively high starting torque and are not adapted for the smooth or soft starting of loads. This defect is eliminated in the motor of the present invention by providing an arrangement which will modulate the rotating field flux with respect to the rotor winding during speed acceleration of the rotor in a manner to provide soft starting with gradually increasing torque during starting. This desirable effect is accomplished by providing a motor having dual rotors.

Referring again to FIG. 1, the dual rotor concept is accomplished by providing an outer second rotor 26 in the form of an annular core structure composed of a plurality of stacked laminations 27 which are punched or otherwise formed to provide axially extending deep slots 28 which contain die cast aluminum or copper bars 29 having their ends shorted through end rings 30. These bars are narrow and deep in order to provide a relatively small conductor area and obtain an effective high resistance and low reactance at the high starting slip frequency, and which will be reversed at full load slip frequency. The bars 29 of the outer rotor, it will be observed, lie between outer air gap 31 and an inner air gap 32, where the reactance is low.

In the construction shown in FIG. 1, the outer rotor 26 is rotatably supported by end plates 33 and 34 respectively, having central antifriction bearing supports 35 and 36 on the power delivery shaft 22. The end plates are connected to the end rings by securing bolts 37 or other suitable means. In order to provide for circulation of cooling medium through the end plates, the end plates are provided with openings 38 in each case. Also, in order to circulate the cooling medium through the passages 25 and openings 38, one of the end plates is provided with blades 39 for inducing flow therethrough. Such flow may be further augmented by an additional fan structure 40 secured to the shaft 22 for rotation therewith, this fan structure being shown as positioned adjacent the blades 39 and axially outwardly spaced therefrom.

Referring now to FIG. 2, the coaction of the rotors will be explained. The outer rotor 26 being supported for independent rotation, and not being a power delivery rotor is free to immediately start and come up to its slip speed. At starting, the high reactance limits current flow in the inner rotor while the high resistance of the outer rotor provides torque to it without high current and permits it to come up to its slip speed. At starting, the slip frequency of the outer rotor is substantially that of the rotating field frequency, and as the rotor comes up to speed, the frequency is reduced. Moreover, advantage is taken of the change in leakage reactants in going from high frequency at which time the reactance is high, to low frequency at which time the leakage reactance is reduced.

At start, the outer rotor begins to move and gains speed. As a result of the large leakage reactance, the field flux as indicated at 41 will initially have its major portion traversing the outer rotor with only a limited portion 41a entering the inner rotor.

As the outer rotor gains in speed, its slip frequency reduces, thus reducing leakage reactance and permitting a greater portion 41b of the flux to enter or penetrate to the inner rotor.

When the outer rotor attains its maximum speed, at which time its slip will be lowest, the leakage reactance will also be at a minimum and the major portion of the field flux will now enter or penetrate the inner rotor as indicated at 41c. The inner rotor having deep, lower resistance bars provides efficient, comparatively low slip operation at its full speed.

This lag of flux between the outer and inner rotors produces a smooth acceleration of load which is not possible with the conventional squirrel cage type motor. The motor of the present invention has low starting current, and the loads may be accelerated very slowly due to this low starting current during a much longer period of time than is possible with a standard squirrel cage motor.

Referring to FIG. 3, the torque output of the inner rotor has been plotted against the speed of the outer rotor. From this graph, it will be observed that at statring, a limited amount of field is applied to the inner rotor to produce torque output, and that as the speed of the outer rotor increases the torque developed in the inner rotor increases substantially linearly so as to produce a smooth application of torque to take up the load imposed on the inner rotor.

Figure 4:
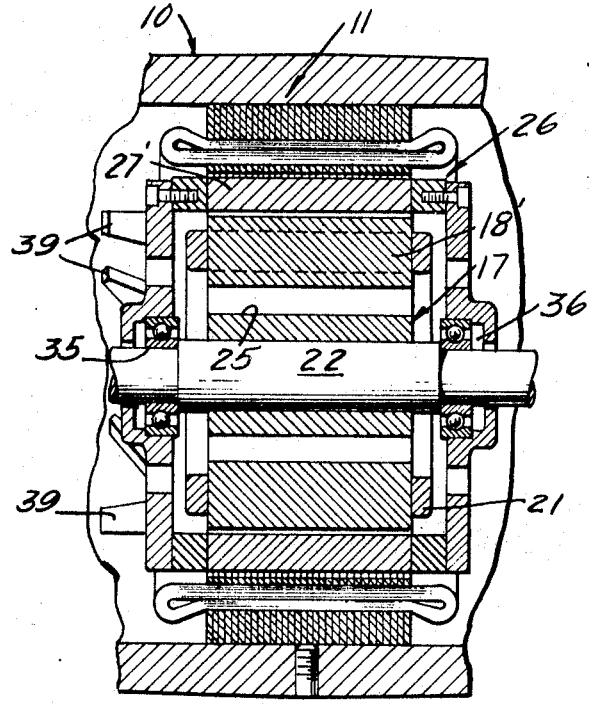
FIG. 4 is a fragmentary sectional view showing modified inner and outer rotor structures.

Referring now to FIG. 4, there is disclosed an alternate modified arrangement which operates upon the same basic principles as that previously described. However, the modified structure as here shown differs in that instead of providing an inner rotor having a laminated core structure, the core is of solid construction as indicated at 18'.

This arrangement also differs over that shown in FIG. 1 in that instead of using a laminated core structure for the outer rotor 26, the core in this case is also of solid construction as indicated at 27'. Since the outer rotor is not a power delivery rotor, this rotor can be made either solid or with laminations depending upon economic considerations. In this modified form, the outer rotor is likewise provided with the blades 39 which are particularly advantageous in cases where the motor is going to be utilized as a torque motor and the inner rotor is not rotated. Under such circumstances, the blades on the outer rotor furnish the required ventilation.

Figure 5:
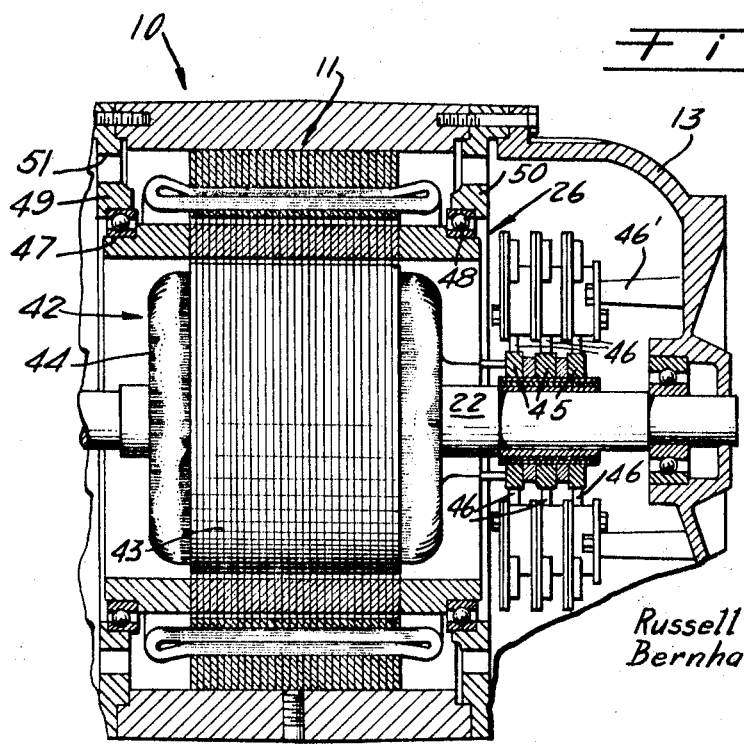
FIG. 5 is a fragmentary sectional view showing another modified arrangement of the inner and outer rotors.

In some installations, it is desirable to have controllable torque during starting and stopping, and in order to take advantage of the soft starting and stopping characteristics of the motor of the present invention, there is shown in FIG. 5 a modified arrangement wherein the inner rotor embodies a conventional wound rotor as generally indicated at 42. In this case the inner rotor is constructed with a core of stacked laminations 43 mounting a conventional winding 44 which has terminal connections brought out to a plurality of slip rings 45 insulatingly carried by the shaft 22 and respectively making contact with separate brushes 46 on appropriate bracket supports 46' attached in this case to the end head 13. As in conventional wound rotor structures, provision is thus made for connecting the rotor with external resistors which can be varied to control the torque characteristics of the motor, and in this case the torque characteristics embodying the smooth starting features of the present invention.

In this construction, the outer rotor 26, instead of being supported rotatably upon the shaft 22, is supported by the housing structure 10. The end plates 33 and 34 have been omitted, and by extending the support for the core structure of the outer rotor, the cylindrical structure of the rotor may be rotatably supported upon antifriction bearings 47 and 48 carried by bearing rings 49 and 50 at the opposite ends of the housing structure 10. These rings are provided with ventilating openings 51 for the flow of cooling medium around the stator core and winding.

While the support for the outer rotor has in this case been discussed in connection with the wound rotor type of inner rotor, the same type of mounting may be employed for the arrangements shown in FIG. 1 and FIG. 4.

From the foregoing description, it is believed that the features and advantages of the present invention will be clearly understood, and that it will be evident that the delineated objects will be accomplished.

Various modifications may suggest themselves to those skilled in the art without departing from the spirit of my invention, and hence, I do not wish to be restricted to the specific forms shown or uses mentioned, except to the extent indicated in the appended claims.

We claim:
1. An induction motor, comprising: a stator frame mounting a winding energizable to set up an alternating rotating magnetic field; a rotatable power delivery shaft extending axially of said stator; a rotor carried by said shaft mounting a winding inductively coupled to said stator winding by said rotating field and energized thereby to drive the rotor in the same direction as the field rotation; and means independently rotative between said stator winding and said rotor for variably modulating the effect of said field flux with respect to said rotor winding as a function of the rotative speed of said means during acceleration of the rotor speed.

2. An induction motor, comprising: a stator frame mounting a winding energizable to set up an alternating rotating magnetic field; a rotatable power delivery shaft extending axially of said stator; a first rotor carried by said shaft mounting a winding inductively coupled to said stator winding by said rotating field so as to be inductively driven; and second rotor means operable between said stator and first rotor windings for modulating the field flux with respect to said first rotor winding, said modulation being responsive to the slip frequency existing between said rotating magnetic field and said second rotor means during acceleration of the first rotor speed.

3. An induction motor, comprising: a stator frame mounting a winding energizable to set up an alternating rotating magnetic field; a rotatable power delivery shaft extending axially of said stator; an inner rotor carried by said shaft mounting a winding in inductively coupled relation to said field winding; and an outer concentric independently freely rotatable rotor having a high resistance squirrel cage winding operable to modulate the field flux with respect to the inner rotor in accordance with changes in the slip frequency of the outer rotor during its acceleration from starting to running speed.

4. An induction motor structure, comprising: a primary stator winding; and dual concentric rotors having windings in inductively coupled relation to said stator winding, one of said rotors having a connected driving shaft and the other being supported for free rotation and having squirrel cage winding bars in closely spaced proximity to said one rotor and the stator winding and having magnetic coupling therewith through relatively small concentric air gaps, the winding of said other rotor being operative to modulate the inductive coupling effect as to said one rotor during acceleration from starting to running speed.

5. An induction motor structure, comprising: a stator frame mounting a winding energizable to produce a rotating field; and dual concentric rotors having windings in inductively coupled relation to said stator winding, one of said rotors having a connected driving shaft and the other being supported on said stator frame for free rotation in the radial space between said one rotor and the stator winding, the winding of said other rotor being operative to modulate the inductive coupling effect as to said one rotor during acceleration from starting to running speed.

6. An induction motor structure, comprising: a primary stator winding energizable to produce a rotating field; an inner rotor and outer rotor respectively having windings in inductively coupled relation to said stator winding; a power delivery shaft fixedly connected to the inner rotor; and members respectively at the ends of said outer rotor having bearing supports on said shaft spaced axially outwardly of the ends of the inner rotor, said end member having ventilating openings for axial movement of ventilating air therethrough to the inner rotor; and air circulating fan blades carried by at least one of said end members for moving said ventilating air.

7. An induction motor structure, comprising: a primary stator winding energizable to produce a rotating field; an inner squirrel cage rotor having a low reactance; a power delivery shaft fixedly connected to the inner rotor; and an outer squirrel cage rotor concentric of the inner rotor and supported for independent free rotation, said outer rotor mounting winding bars dimensioned to have high resistance and low reactance at starting slip frequency, and vice versa at full load slip frequency, whereby the rotating field will be modulated relative to the inner squirrel cage rotor during starting acceleration.

8. An induction motor according to claim 7, wherein the outer rotor has a laminated core.

9. An induction motor according to claim 7, wherein the outer rotor has a solid core.

10. An induction motor according to claim 7, wherein the inner rotor has a laminated core.

11. An induction motor according to claim 7, wherein the inner rotor has a solid core.

12. An induction motor structure, comprising: a primary stator winding energizable to produce a rotating field; an inner wound rotor having slip ring connections connectable with adjustable exterior resitsors; a power delivery shaft fixedly connected to the inner rotor; and an outer squirrel cage rotor concentric of the inner rotor and supported for independent free rotation, said outer rotor mounting winding bars dimensioned to have high resistance and low reactance at starting slip frequency, and vice versa at full load slip frequency, whereby the rotating field will be modulated relative to the inner wound rotor during starting acceleration.

References Cited

UNITED STATES PATENTS

| | | | |
|---|---|---|---|
| 1,913,211 | 6/1933 | Prince | 310—266 |
| 2,507,399 | 5/1950 | Christensen | 310—115 |
| 2,864,017 | 12/1958 | Waltscheff | 310—115 |
| 2,604,501 | 7/1952 | Wightman | 310—63 |
| 2,716,195 | 8/1955 | Anderson | 310—63 |

FOREIGN PATENTS 598,601  6/1934  Germany.

MILTON O. HIRSHFIELD, *Primary Examiner.*

R. SKUDY, *Assistant Examiner.*

U.S. Cl. X.R.

310—266